US005441647A

United States Patent [19]

Wascher et al.

[11] Patent Number: 5,441,647

[45] Date of Patent: Aug. 15, 1995

[54] MAGNETIC DEVICE FOR REMOVING METALLIC MATTER FROM LUBRICATING FLUIDS

[76] Inventors: Rick R. Wascher, P.O. Box 198468, Hermitage, Tenn. 37076; Roy L. Neuhauser, III, P.O. Box 10613, Knoxville, Tenn. 37939; Ray Fairbanks, Jr., 1806 E. Main St., Murfreesboro, Tenn. 37130

[21] Appl. No.: 197,648

[22] Filed: Feb. 17, 1994

[51] Int. Cl.[6] .............................................. B01D 35/06

[52] U.S. Cl. .................................... 210/695; 210/223; 335/303

[58] Field of Search ................. 210/223, 695; 335/303

[56] References Cited

U.S. PATENT DOCUMENTS

| | | | |
|---|---|---|---|
| 3,480,145 | 11/1969 | Gladden | 210/223 |
| 4,826,592 | 5/1989 | Taylor | 210/223 |
| 5,089,129 | 2/1992 | Brigman | 210/223 |

*Primary Examiner*—Matthew O. Savage
*Attorney, Agent, or Firm*—Rick R. Wascher

[57] ABSTRACT

The present invention is directed to an apparatus and method for magnetically filtering metallic particulates from lubricating fluids or oils used in motorized vehicles. The invention includes a magnet and an optional sleeve. The sleeve holds the magnet and is configured for overlying the canister of a canister type oil filter. The sleeve is preferably made from a high temperature resistant material to withstand the heat associated with the operating temperature of the oil within filter. The invention is also directed to a magnetically assisted oil filter having a magnet incorporated into the canister.

3 Claims, 3 Drawing Sheets

44

78

76

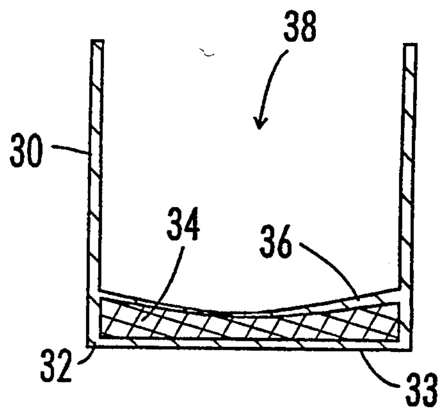
FIG. 2A
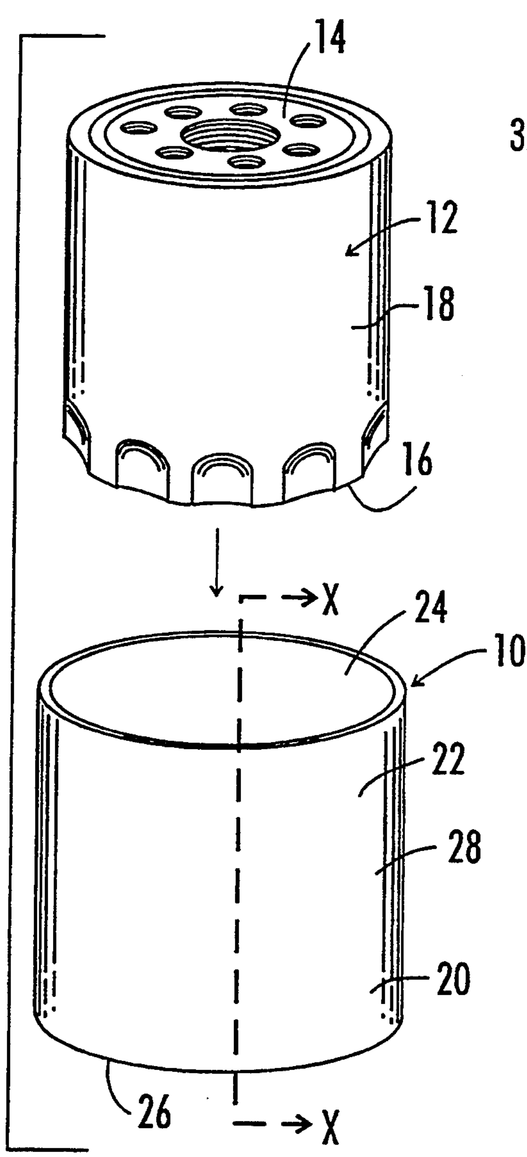
FIG. 1
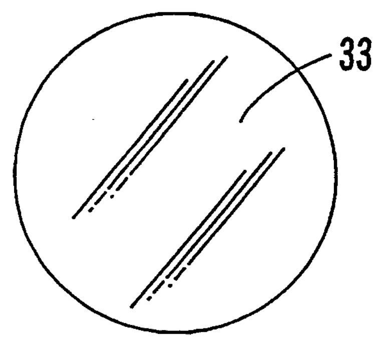
FIG. 2B
FIG. 2C
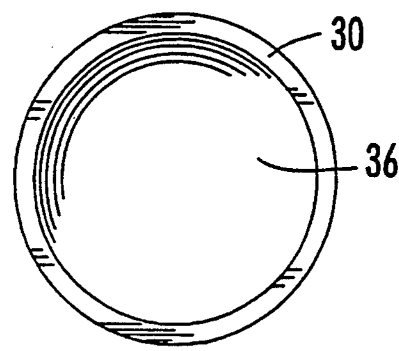

MAGNETIC DEVICE FOR REMOVING METALLIC MATTER FROM LUBRICATING FLUIDS

BACKGROUND OF THE INVENTION

1. Field of the Invention

The present invention relates generally to filters used for filtering and removing particulate substances from fluids. More particularly the present invention relates to canister-type filters used to remove particulate matter from lubricating fluids.

2. Description of the Related Art

Canister-type filters for filtering lubricating fluids and other fluids, hereinafter "canister filters," are well known. Canister filters are commonly used to filter particulate matter and debris from lubricating fluids (e.g., oil) used in automobiles, boats, trucks, tractors, heavy machinery, airplanes, and other motorized vehicles, hereinafter collectively referred to as "motorized vehicles."

Most of the particulate matter carried by and flowing within the oil used to lubricate motorized vehicles is metallic. It is known that removing particulate matter, especially metallic particulates, from the lubricating oil of motorized vehicles tends to decrease engine component wear, and increase the useful life of the engine or motor.

Most canister oil filters include a canister having a single open end to form a well, a substantially cylindrical filter element within the well. The shape of the filter element corresponds to the shape of the well and usually has a central channel. A perforated cap fits over the open end of the canister, which is typically constructed of metal capable of withstanding the high operating temperatures associated with the working fluid. The filtering material is usually fabric or paper, and may include glass fibers or the like. The perforated cap has a fluid inlet, and a fluid exit.

Oil pumped into the canister through the inlet passes through the porous material of the filter element before exiting the canister through the fluid exit. As a result of the limitations associated with the material of the filter element, among other things, a measurable amount of particulate matter is known to escape the canister without becoming entrained within the filtering material.

Until now, it is believed that a filter or other device, of the type described herein below, to continuously increase the efficiency of canister filters at extracting metallic particulates from lubricating fluids of motorized vehicles has not been invented.

SUMMARY OF THE INVENTION

The present invention is useful for trapping metallic particles, present in lubricating fluids such as oil, within the confines of the canister of a canister oil filter.

One embodiment of the invention includes a magnet or magnetic means for attracting metallic particles, and sleeve or sleeve means for holding the magnetic means adjacent the bottom of the canister. The shape of the magnet and sleeve may vary. In addition, the sleeve means or magnetic means may be formed from a single component or several components.

In the preferred embodiment of the invention, the shape of the magnet conforms to the shape of the exterior bottom surface of the canister, and the sleeve is generally cylindrical and closed at one end. Preferably, the sleeve is dimensionally sized to overlie the canister with which it will be used.

The sleeve may have a continuous rigid or flexible side wall or be divided to form finger-like projections. The sleeve may be made from a pliable or rigid material, and may be elastic.

The sleeve should be constructed of a material capable of withstanding the high temperatures corresponding to the operating temperature of the engine oil to be filtered. The sleeve, therefore, may be constructed of a metallic or fibrous material having a melting point greater than the operating temperature of the oil. For example, high temperature rubber hose material like that used for radiator hose in motorized vehicles may be used.

In addition, the sleeve means of the present invention may be constructed to incorporate or otherwise encapsulate the magnet, within a magnet receptacle, or may simply overlie the magnet as a separate component of the invention. That is, invention may be constructed such that the magnet or magnetic means may be removable from the sleeve.

In another embodiment of the present invention, the magnet is contained within the filter canister, thereby eliminating the need for a sleeve component. The magnetic means may be partitioned from the fluid receiving well of the canister by an internal wall structure and thus not allowed to contact the lubricating oil, or the magnetic means may come in direct contact with the lubricating fluid.

In an alternate embodiment of the present invention, a magnet is housed within the receptacle and the receptacle is placed adjacent the canister of the filter. That is, the length of the sleeve is minimized or eliminated such that the magnetic means, contained within a protective sheath (the receptacle) may be applied to the canister. The attractive force of the magnet holds the magnet and receptacle combination in place without the need for an additional sleeve member.

The method of the present invention is direct to establishing the conditions necessary to magnetically filter metallic particulates from lubricating oil used in a motorized vehicle during operation of the vehicle.

The method includes the steps of attaching a canister type oil filter having an interior and an exterior, to the oil filter connection of a motorized vehicle; providing an attractive magnetic force, originating from the filter, to the lubricating oil or fluid in order to attract metallic particulates and trap them in the canister.

Of course, the step of providing an attractive magnetic force may further include the step of attaching a magnet to the canister of the oil filter. In the preferred method of the invention, any of the apparatuses contemplated within the scope of the above disclosure are applied to the exterior surface of the canister of an oil filter.

It is an object of the present invention to provide a device for decreasing the abrasive wear on an engine due to metallic particulates flowing within the lubricating oil of the engine.

It is an object of the present invention to provide a reusable oil filter assist device for external use with conventional metallic canister type oil filters.

It is an object of the present invention to provide a device for continuously removing metallic particles from engine lubricating oil while the engine is operating.

It is an object of the present invention to: provide a device to overly the canister of an oil filter capable of withstanding the high temperatures associated with engine lubricating oils during engine operation, and to magnetically attract metallic particles within the filter canister and magnetically hold the particles within the filter canister during operation of the motorized vehicle.

The above stated objects are provided by way of example and are not intended to be an all inclusive list of objects of the invention. Accordingly, these and other objects and advantages of the present invention shall become apparent after consideration of the description, and claims set forth below.

BRIEF DESCRIPTION OF THE DRAWINGS

FIG. 1 is an exploded perspective view of a conventional oil filter and an embodiment of the present invention shown in relative alignment with one another;

FIG. 2A is a cross-sectional view of the embodiment of the invention shown in FIG. 1;

FIG. 2B is a bottom view of the embodiment shown in FIGS. 1 and 2A;

FIG. 2C is a top view of the embodiment shown in FIGS. 1 and 2A;

Figure 3A:
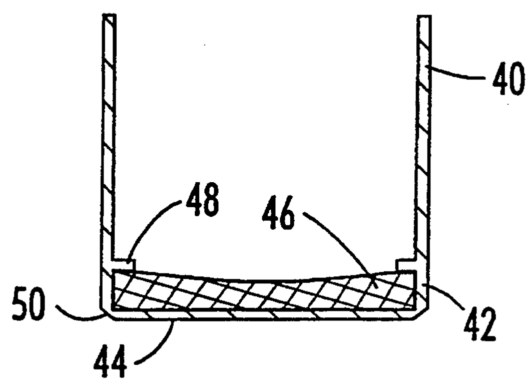
FIG. 3A is an alternate embodiment of the invention shown in FIG. 2A.

As best seen in FIG. 1, a canister type oil filter is designated generally by the reference numeral 12. Filter 12 has an open top 14, a closed arcuate bottom 16, a contiguous side wall 18, and a filter element (not shown) inside the canister 12. A preferred embodiment of the present invention is designated generally by the reference numeral 10 of FIG. 1. The invention 10 includes a continuous wall 28 having a distal portion 20, a proximal portion 22, a well 24 configured to receive the canister filter 12, and a bottom 26.

The embodiments of the invention 10 may be flexible or substantially rigid, such that invention 10 is installed on the filter 12 by inserting the canister 12 into the well 24. 0f course, if the sleeve portion is rigid, the size or diameter of the interior well 16 must be slightly larger than the outside diameter of the canister filter 12.

An alternate embodiment of the invention is shown in FIGS. 2A–2C. Sleeve 30 is in communication with the bottom 33 at an annular rim 32. Magnet 34 is contained within the pocket 36 which serves as the means for holding or otherwise positioning the magnet adjacent the canister filter, like that shown in FIG. 1, when the canister 12 is inserted into the well 38.

Figure 3B:
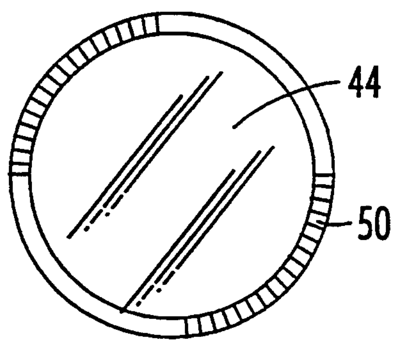
FIG. 3B is a bottom view of the embodiment shown in FIG. 3A.
Figure 3C:
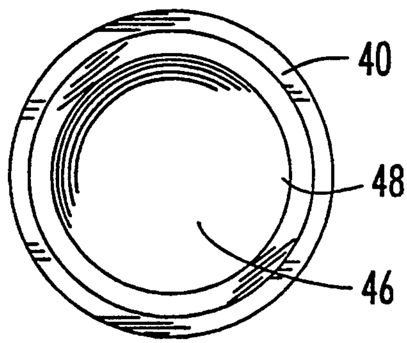
FIG. 3C is a top view of the embodiment shown in FIG. 3A.

Another alternate embodiment of the invention is shown in FIGS. 3A–3C. Sleeve 40 is in communication with the bottom 44 having a beveled edge 50. Magnet 46 is partially exposed but contained within the magnet receiving pocket 42 and held in place by an annular ring 48.

Figure 4A:
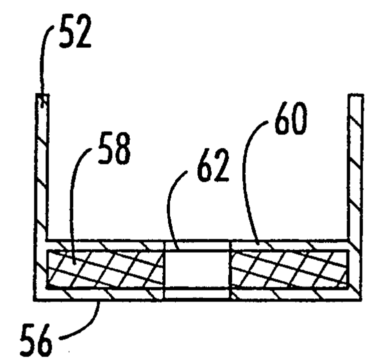
FIG. 4A is another alternate embodiment of the invention shown in FIG. 2A.
Figure 4B:
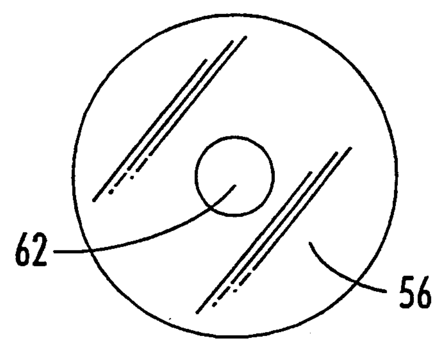
FIG. 4B is a bottom view of the embodiment shown in FIG. 4A.
Figure 4C:
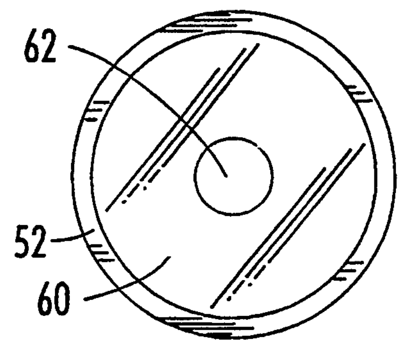
FIG. 4C is a top view of the embodiment shown in FIG. 4A.

Another alternate embodiment is shown in FIGS. 4A–4C. Sleeve 52 is in communication with the bottom 56. Magnet 58 is contained within the magnet receiving means 60. Aperture 62 is formed through the magnet 58 and magnet receiving means 60 to provide a vent for allowing air to flow into the interior of the sleeve 52 when a canister type filter (see FIG. 1) is inserted into the sleeve well (unnumbered). The air flow prevents the filter from becoming stuck inside the sleeve.

Figure 5:
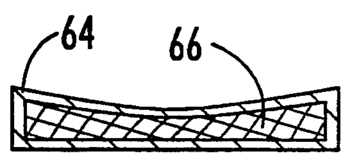
FIG. 5 is a cross-sectional view of an alternate embodiment of the invention shown in FIG. 2A.

With Reference to FIG. 5, the invention may also comprise a disk like magnet receiving portion 64 overlying an arcuate magnet 66. With this embodiment the user simply attaches the combination of the magnet receiving means 64 and magnet 66 to the bottom of a canister type oil filter (FIG. 1). The arcuate magnet 66 is designed to conform to the bottom surface of the canister filter.

Figure 6:
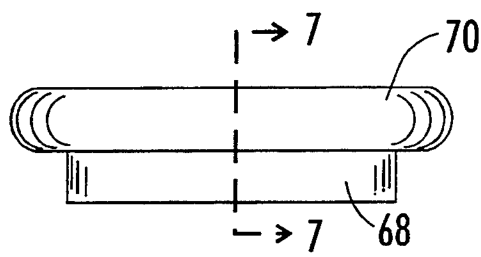
FIG. 6 is a side view of an alternate embodiment of the invention shown in FIG. 1.
Figure 7:
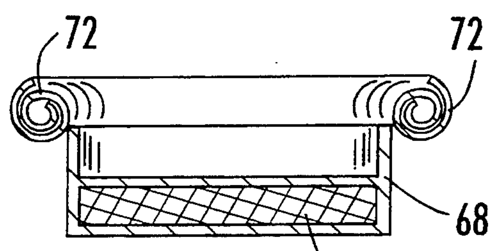
FIG. 7 is a cross-sectional view of the embodiment shown in FIG. 6.

FIGS. 6–12 show alternate embodiments of the present invention, but more particularly illustrate the various configurations of the magnet portion and the sleeve portion. As shown in FIGS. 6 and 7 sleeve 70 has a bottom 68 and a rolled portion 72 in communication with a magnet receiving portion 74.

Figure 8:
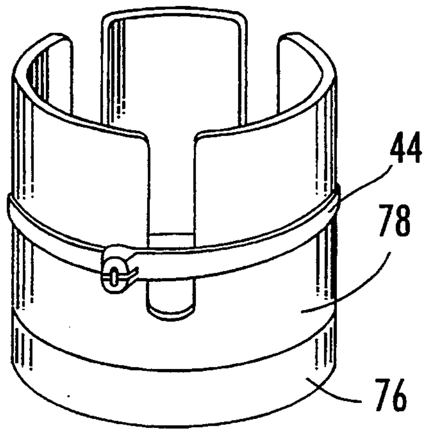
FIG. 8 is an alternate embodiment of the invention shown in FIG. 1.
Figure 9:
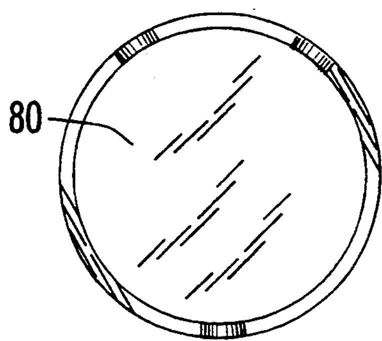
FIG. 9 is a top view of the embodiment shown in FIG. 8.

With reference to FIGS. 8 and 9, magnet receiving portion 76 receives a magnate for placement adjacent the closed bottom wall 16 of the filter, and is in communication with the sleeve portion 78. The sleeve includes a flexible wall having axially opposite first and second end portions. The magnet receiving portion 76 includes a magnet and is located at the first end portion, and the second end portion includes a plurality of axially extending finger portions. Each finger portion has a free end and a radially inner surface for engagement of the exterior surface of the continuous side wall of the oil filter. The fingers may be formed perpendicular (FIG. 8) to and extend upwardly from the magnet portion 76. An optional tie down strap 44 may be used to tighten the fingers around the canister of an oil filter. If the fingers are formed to project slightly inward, the optional tie strap 44 may not be needed. Depending upon the material composition of the invention, a slightly inward projection of the fingers would apply an inward force on the canister to which it is applied ion order to help prevent inadvertent disengagement therefrom. The device shown in FIGS. 8–9 can be used to carry out a method of establishing the conditions to magnetically filter metallic matter from lubricating fluid used in a motor vehicle during operation of the vehicle. The method includes the steps of: attaching a filter such as the type shown in FIG. 1 to a motorized vehicle using lubricating fluid; and attaching the device to the canister of the filter such that the sleeve surrounds the side wall 18, the radially inner surfaces of the fingers engage the sidewall, and the magnet is adjacent the bottom wall 16 to provide an attractive magnetic force to the lubricating fluid to attract metallic particulates and trap them within the canister.

Figure 10:
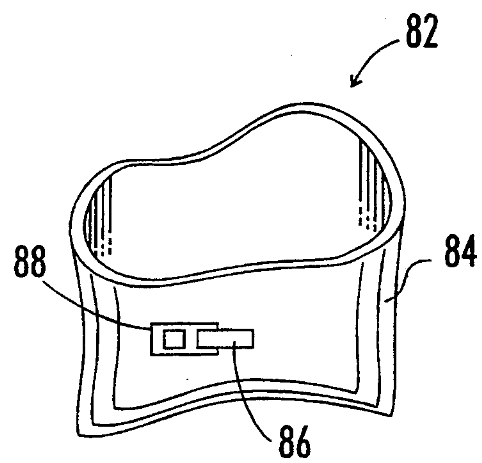
FIG. 10 is an alternate embodiment of the invention.

As shown in FIG. 10, an alternate embodiment of the present invention is designated by reference numeral 82. A magnet portion contained within a receptacle (not shown) and the sleeve is flexible, and may be universally sized to accommodate any diameter of the filter canister. If the sleeve is universally sized, and made for example of a heat resistant fabric, plastic, or rubber, an optional drawstring 86 may be used to tighten the sleeve around the canister (not shown). The external surface 84 of invention 82 includes an opening 88 to receive the drawstring.

Figure 11:
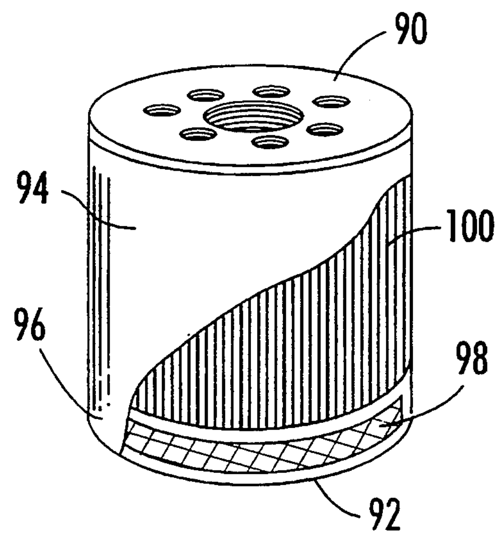
FIG. 11 is an alternate embodiment of the invention.

As shown in FIG. 11, an alternate embodiment of the present invention is designated generally by the reference numeral 90. The filter includes a canister 94, a receptacle 92, and a magnet 98 housed within the distal end 96 of the canister 94. As shown in the drawing, the magnet 98 is fully enclosed within the receptacle 92, but the magnet may be exposed to the interior well 100 of the canister 94 to allow the oil to wash over the surfaces of the magnet 98. Of course, the magnet 98 may be coated (not shown) to prevent any magnetized material that is dislodged from the magnet from being introduced into the oil washing over it.

Similarly, the magnets of any of the embodiments set forth herein and equivalents thereto may include coated magnets to increase efficiency or prolong the useful life of the invention. In addition, it is also contemplated as part of the present invention to incorporate an electrically charged magnet in any of the embodiment of the invention.

These and other embodiments of the present invention, and equivalents thereof, will become apparent after consideration of the specification and claims. All such devices and methods are solely limited by the scope of the appended claims.

What is claimed is:

1. A device for increasing the efficiency of an oil filter having a canister including an open top end, a closed bottom wall, and a continuous sidewall extending between said open top and closed bottom wall, said continuous sidewall and closed bottom wall defining an exterior surface of said oil filter, the device comprising:

magnetic means for attracting metallic particles; and means for holding the magnetic means adjacent said closed bottom wall;

wherein the means for holding is a sleeve having an axis, said sleeve including a flexible wall having axially opposite first and second end portions, wherein said magnetic means is located at said first end portion, and wherein said second end portion includes a plurality of axially extending finger portions, each said finger portion having a free end and a radially inner surface for engagement of the exterior surface of said continuous side wall.

2. The device of claim 1, including a tie strap to tighten the fingers around the side wall of the canister.

3. A method of establishing the conditions to magnetically filter metallic matter from lubricating fluid used in a motorized vehicle during operation of the vehicle, the method comprising the steps of:

attaching a filter to a motorized vehicle using lubricating fluid, said filter having a canister including an open top end, a closed bottom wall, and a continuous sidewall extending between said open top and closed bottom, said continuous sidewall and closed bottom wall defining an exterior surface of said filter;

providing the device according to claim 1;

attaching said device to the canister of the filter such that said sleeve surrounds the exterior surface of said continuous sidewall, the radially inner surfaces of said fingers engage said continuous sidewall, and said magnet means is positioned adjacent the exterior surface of said closed bottom wall to provide an attractive magnetic force to the lubricating fluid to attract metallic particulates and trap them within the canister.

* * * * *